Figure 1:
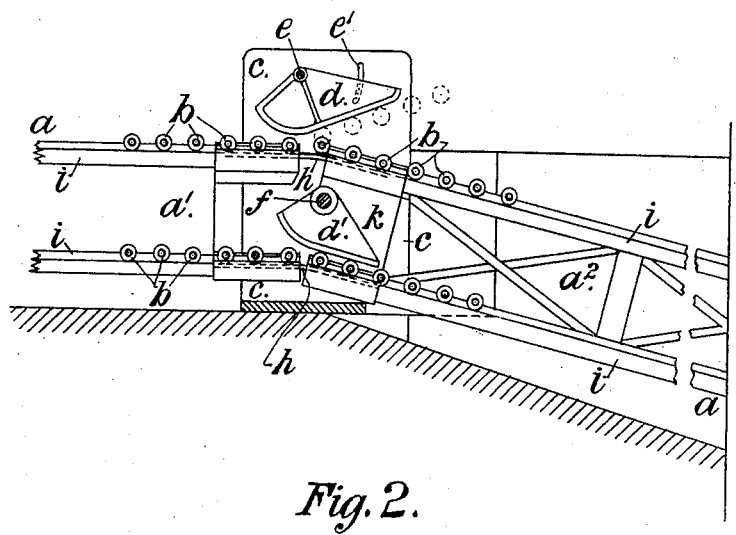

No. 779,465. PATENTED JAN. 10, 1905.
W. CARR.
CONVEYER.
APPLICATION FILED AUG. 4, 1903.

2 SHEETS—SHEET 1.

WITNESSES
HM Kuehne
E. C. Smith

INVENTOR
J. Wesley Carr
By Richards
ATTORNEYS

No. 779,465. PATENTED JAN. 10, 1905.
W. CARR.
CONVEYER.
APPLICATION FILED AUG. 4, 1903.

2 SHEETS—SHEET 2.

WITNESSES
INVENTOR
Wesley Carr
BY
ATTORNEYS

No. 779,465.

Patented January 10, 1905.

UNITED STATES PATENT OFFICE.

WESLEY CARR, OF PORT SUNLIGHT, ENGLAND.

CONVEYER.

SPECIFICATION forming part of Letters Patent No. 779,465, dated January 10, 1905.

Application filed August 4, 1903. Serial No. 168,206.

*To all whom it may concern:*

Be it known that I, WESLEY CARR, a subject of the King of England, residing at 274 New Chester road, Port Sunlight, in the county of Chester, England, have invented certain new and useful Improvements in or Connected with Conveyers, of which the following is a specification.

This invention has reference to conveyers for carrying boxes, bags, or the like from the manufactory, wharf, or other place to a vessel floating in tidal water, a warehouse having several floors, or the like, where things have to be delivered at different heights at different times, and is designed more especially for that system of conveyers in which a couple of endless chains propel an endless platform of moving rollers, these rollers or chains passing round sprocket-wheels or the like. Now in order to enable a traveling conveyer of this sort to rise and fall at any given point from one end or through a part of its course while stationary at the other end I place at the point where the bend has to take place a stout framework. This framework has connected with it, on either side, an adjustable guide-block, so as to guide the rollers or sprocket-chains at the maximum travel upward, so as only to allow the chain to bend at this point. The return-chain also has a similar guide-block on either side to guide it; but these guide-blocks oscillate on a spindle carried in bearings in the said frame. Whenever the end of the movable part of the conveyer carrying the conveying-chains and sprocket-wheels rises and falls about its pivot, the blocks oscillate to the required amount, and thus the conveyer is allowed to bend to any extent required, while the rollers are always maintained on their tracks. It would, however, be impossible for the conveyer to bend in this way if the girders or framework at the junction of the two portions of the conveyer touched each other either at the top or bottom, while if they did not touch there would be a danger of the rollers falling into the gap and sticking. In order to avoid this, I attach to the movable conveyer-framework or the fixed framework, as may be most convenient, a thin blade of flexible steel, covering the hiatus and a small portion of the framework of the stationary part of the conveyer, and this is arranged both above and below. Consequently the rollers mount the thin blade and travel along it from the one framework to the other. The rising and falling end of the movable framework is fixed on a float, pontoon, or other device, regulated either by the height of the water or by hydraulic or other means. In the case of a sea-wall it is fixed on a tank or pontoon floating in the water and guided by guides and guide-rollers, so as to rise and fall in a curvilinear direction required by the angular motion of the end of the movable framework of the conveyer in order that undue stress may not come upon the movable framework. The pontoon is supplied with water ballast, which may be admitted or expelled in any suitable way, according as the discharge-chute is to be raised or lowered. This chute is connected with the end of the conveyer and is preferably counterweighted by means of chains passing over pulleys on the tops of pedestals or standards, counterweights being attached to the chains.

Drawings illustrating my invention are annexed hereto, in which—

Figure 2:
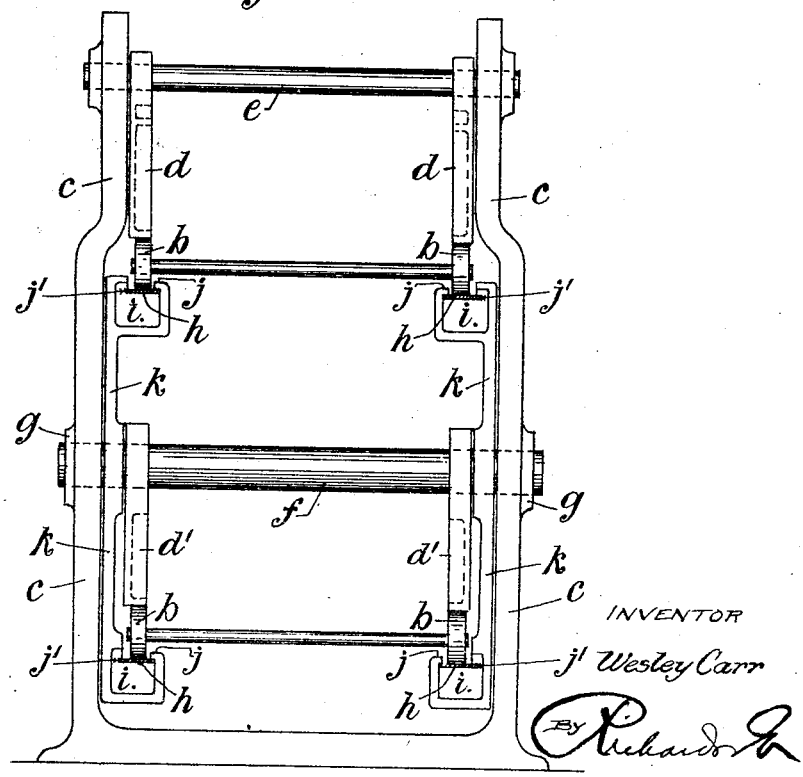
Figure 3:
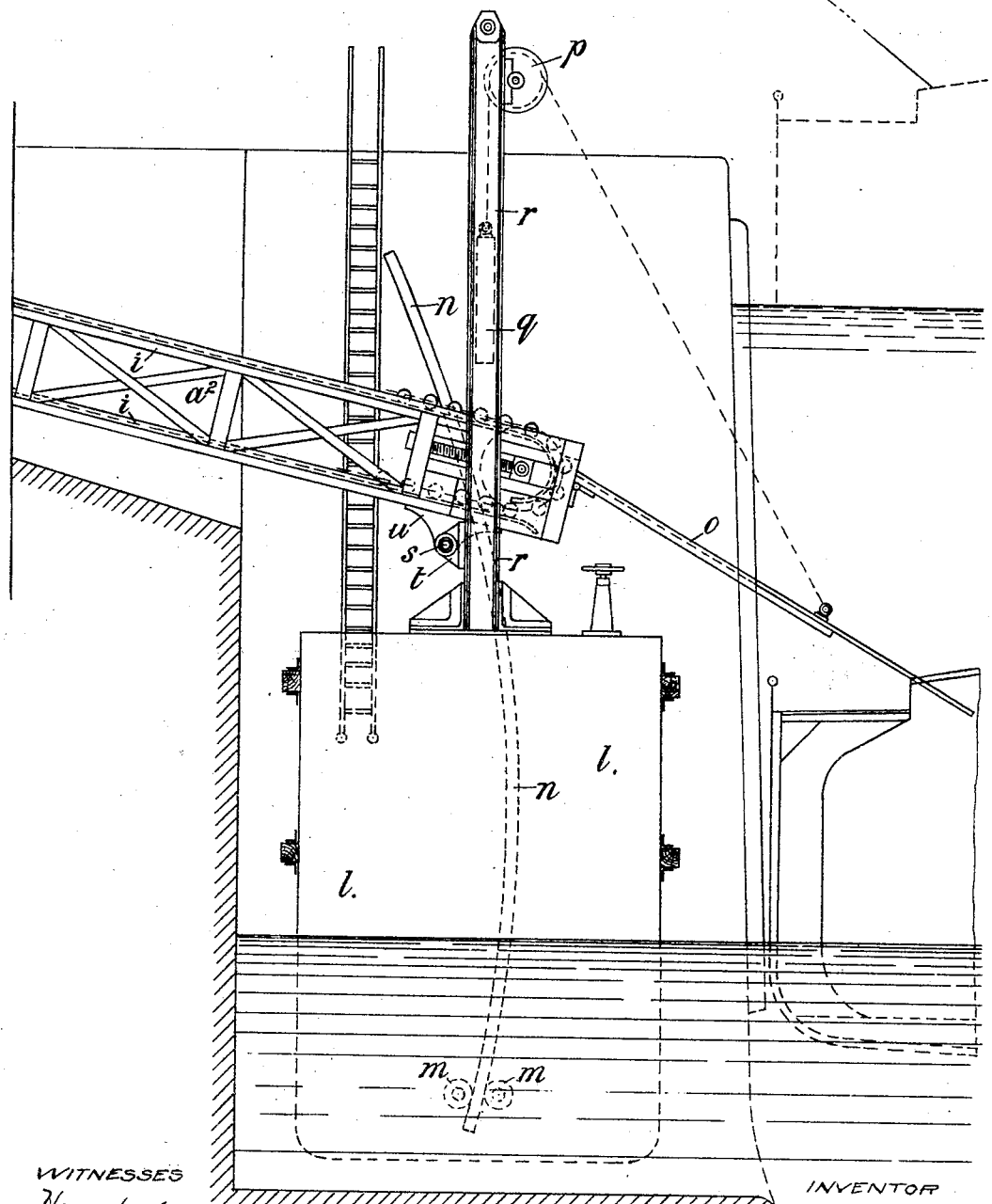

Figure 1 is a side sectional elevation of a conveyer of the kind herein described comprising a stationary and a movable part and means for guiding the rollers or chains, while Fig. 2 is an end view of the movable part of the conveyer, drawn to an enlarged scale. Fig. 3 shows the end of the movable part of the conveyer and parts connected therewith resting upon a pontoon in a tidal-way.

Referring now to the drawings, $a$ generally designates a traveling conveyer of the type usually employed for transporting packages from one place to another, comprising a stationary part $a'$ and a movable part $a^2$, and $b$ designates rollers to which carrying-slats may be connected in any known suitable way. The rollers are actuated by means of endless chains passing round sprocket or like wheels at either end of the conveyer $a$ in the usual manner.

$c$ represents the framework to which the adjustable guide-blocks $d$ are connected, these being mounted on the shaft $e$, the means of adjustment being by, say, a bolt passing through a slot $e'$ on either side of the framework.

$d'$ represents the oscillating guide-blocks firmly disposed upon the spindle or shaft $f$, carried in the bearings $g$ of the frame $c$.

$h$ designates the thin blades of steel or other suitable flexible material, which are provided for the purpose of bridging the hiatus formed between the stationary and movable parts $a'$ $a^2$ of the conveyer $a$ and over which the rollers pass from the one part of the conveyer to the other. In the construction shown these thin blades or strips $h$ are disposed within countersunk recesses provided for them in the girders $i$ of the conveyer, being flush with the top of same. These steel strips $h$ are secured to the girders on the movable portion $a^2$ of the conveyer in any convenient manner, or they may be secured to the stationary part $a'$, and if it be necessary to hold them down in position on the girders guides formed by the projecting part $j$ of the plate $k$ and recesses $j'$, formed in the girders $i$ at this part, may be provided, within which the strips will slide backward and forward, according to the movement down or up of the movable part $a^2$ of the conveyer. In some cases these flexible strips may be placed directly on top of the girders $i$ at the point of junction of the stationary and movable parts, being beveled at either end, so that the rollers will mount them easily and without shock.

As shown in the drawings, the upper and lower girders $i$ on either side of the movable part of the conveyer are connected together by the plate $k$, carried upon the spindle or shaft $f$, the girders resting within beds provided for them, as shown. As a modified construction, however, the girders of the movable part of the conveyer may rest within beds formed by angle-irons, these being riveted to the plate $k$.

Referring now more particularly to Fig. 3 of the drawings, the movable end part $a^2$ of the conveyer is pivoted upon the shaft $s$, which is carried in brackets $t$, secured to the pedestals or standards $r$ (of which there are two) by means of a bracket $u$, connected with each of the lower girders $i$ of the conveyer. The sides of the pontoon are provided with rollers $m$, which engage with a curved guide-rod $n$ on either side, (these rods being firmly attached to the walls of the dock,) whereby the pontoon is maintained in an upright position and a curvilinear motion is imparted to it on rising and falling and undue stress on the conveyer during its angular motion being obviated.

A chute $o$ is connected with the end of the conveyer, the end of said chute being connected with chains passing over the pulleys $p$, one on either standard $r$, the ends of the chains being connected with counterweights $q$, disposed within the standards $r$ on either side of the chute and conveyer.

The mode of action is as follows: A vessel $s$ to be loaded is brought to the wharf. The pontoon $l$, with its pedestals $r$, is fixed at the required height relatively with the vessel $s$ by admitting or discharging water from the pontoon in any suitable known way and the chute is lowered down to the vessel $s$. Boxes, bags, or the like are now placed on the conveyer, which is set in motion, and they travel along to the movable part of the conveyer, whence they pass to the chute $o$, down which they slide toward the vessel $s$. As the vessel $s$ becomes gradually filled the chute is lowered by admitting water to the pontoon.

Having now described my invention, what I claim as new, and desire to secure by Letters Patent, is—

1. A conveyer of the kind herein described comprising a stationary and a movable part, the end of said movable part adjacent the stationary part being so formed and pivoted as to admit of the said movable part being raised and lowered relatively to the stationary part, and guide-blocks disposed at the junction of the stationary and movable parts, the upper blocks being fixed and the lower blocks adapted to oscillate with the movable part of the conveyer, for the purposes specified.

2. A conveyer of the kind herein described, comprising a stationary and a movable part, the end of said movable part adjacent the stationary part being so formed and pivoted as to admit of the said movable part being raised and lowered relatively to the stationary part; guide-blocks disposed at the junction of said stationary and movable parts, the upper blocks being fixed and the lower blocks adapted to oscillate with the movable part of the conveyer; and blades or strips of flexible material adapted to bridge the hiatus between said stationary and movable parts, for the purpose specified.

3. In connection with conveyers having stationary and movable parts, the employment in connection with the floating structure upon which the end of the movable part of the conveyer rests, of means as specified for guiding said pontoon when rising and falling for the purposes described.

4. A conveyer having a stationary part $a'$ and a movable part $a^2$ pivoted at $f$, fixed guide-blocks $d$, and oscillating guide-blocks $d'$, a framework $g$ carrying said guide-blocks; and flexible strips $h$, adapted to bridge the hiatus between said stationary and movable parts; substantially as described.

5. In connection with a conveyer having a stationary and a movable part, a pontoon $l$ having pedestals or standards $r$ upon it, a shaft or spindle $s$ carried in brackets $t$ mounted on said standards; and brackets $u$ connected with the lower girders of the conveyer and by which said movable part is pivoted to the shaft $s$; substantially as described.

6. In connection with a conveyer having a stationary and a movable part, a pontoon $l$, having hollow pedestals or standards $r$ upon it; a shaft or spindle $s$ carried in brackets $t$ mounted on said standards; brackets $u$ connected with the lower girders of the conveyer, and by which the movable part is pivoted to the shaft $s$; and a chute $o$ connected by chains passing over pulleys $p$ with counterweights $q$ disposed within the hollow standards $r$; substantially as described.

In witness whereof I have hereunto set my hand in presence of two witnesses.

WESLEY CARR.

Witnesses:
JOHN HINDLEY WALKER,
ISABEL F. WALKER.